United States Patent Office 3,708,526

Patented Jan. 2, 1973

3,708,526

ALKYL AMIDOSULFINIC ACID (BIS-ALKYLAMINE) SALTS AND METHOD FOR THEIR PREPARATION

Ludo K. Frevel, Midland, and Leonard J. Kressley, Saginaw, Mich., assignors to The Dow Chemical Company, Midland, Mich.

No Drawing. Filed Oct. 3, 1968, Ser. No. 764,949

Int. Cl. C07c *145/00*

U.S. Cl. 260—501.12 10 Claims

ABSTRACT OF THE DISCLOSURE

New aliphatic imidodisulfinic acid (aliphatic amine) salts are prepared by reacting a primary aliphatic amine or an alkanolamine having a primary amino group with $SO_2$ under anhydrous conditions and in the absence of oxygen. The compounds react with Cu, Pb, Hg and other inorganic cations to form colored solutions or precipitates. They are useful as analytical reagents for metal ions.

This invention relates to new aliphatic imidodisulfinic acid (aliphatic amine) salts having the generic structure $$R_1NH_3\cdot O-\overset{O}{S}-\underset{R_2}{\underset{|}{N}}-\overset{O}{S}-O\cdot Z$$

wherein $R_1$ and $R_2$ each represents an open chain saturated hydrocarbon group of 1 to 20 C atoms, a cycloaliphatic hydrocarbon group having 5 to 8 ring C atoms, a hydroxylated open chain hydrocarbon group of 2 to 20 C atoms, a hydroxylated cycloaliphatic hydrocarbon group having 5 to 8 ring C atoms, and halogen cyano or alkoxy substituted derivatives of said hydrocarbon groups, and Z represents H or an $H_3N(R_3)$ group where $R_3$ is the same as $R_1$ and $R_2$ with the further proviso that when Z is H, $R_1$ and $R_2$ each represents a hydroxylated open chain or cycloaliphatic hydrocarbon group as above defined, and to methods of preparing the compounds by reacting a primary aliphatic amine or primary aminoalcohol with $SO_2$ under substantially anhydrous conditions and in an inert atmosphere at temperatures below the decomposition points of the said salts.

The new compounds are soluble in water and, in aqueous solution, they react with inorganic cations to form colored solutions or precipitates and are therefore useful as analytical reagents. To a 5 weight percent aqueous mercuric acetate solution a small amount of bis(cyclohexylammonium) cyclohexylimidodisulfinate was added with stirring. A gray precipitate was rapidly obtained which on settling left a slightly amber colored solution. When the same compound was added to 10 weight percent aqueous Fe $SO_4$ solution, the solution changed from green to light brown. No precipitate formed but a somewhat oily film developed on the surface of the solution. The remaining compounds of this invention also form colored compounds or precipitates with mercuric ions. Cupric and lead ions also form precipitates or colored solutions with the compounds.

The aliphatic imidodisulfinic acid (aliphatic amine) salts are decomposed by strong acids with the liberation of $SO_2$.

The novel compounds of this invention are all solid at room temperature and usually white in color when prepared and purified. On standing, some tend to turn slightly yellow due to decomposition. Some of the compounds can be sublimed and thus can be obtained in a very high degree of purity.

The primary monoamines which can be employed in making the new compounds of this invention include any open chain aliphatic amine having 1 to 20 carbon atoms and any cycloaliphatic amine having 5 to 8 carbon atoms in the cycloaliphatic ring. The amines can be substituted with inert groups such as hydrocarbon groups, halogen groups, nitrile groups or alkoxy groups.

Representative primary amines which can be employed are methylamine, ethylamine, fluoro-, or chloro-, ethylamines in which the 2-carbon atom has from 1 to 2 halogen substituents which can be the same or different, the propyl-, butyl-, pentyl-, hexyl-, heptyl-, octyl-, nonyl-, decyl-, undecyl-, dodecyl, tridecyl-, tetradecyl-, pentadecyl-, hexadecyl-, heptadecyl-, octadecyl-, nonadecyl- or eicosyl-amines, cyclopentyl-, cyclohexyl-, cycloheptyl- or cycloctyl-amines, or their halogen, cyano, alkoxy or hydrocarbon-substituted derivatives. It is to be understood that the primary amino group, or any open chain amine containing three carbon atoms or more, need not be on a terminal carbon atom.

Typical of the alkanolamines which can be used are $$HOCH_2CH_2NH_2,\ CH_3CHOHCH_2NH_2$$

$$HOCH_2CH_2CH_2NH_2$$

$$CH_2\underset{NH_2}{\underset{|}{C}}H-CH_2OH$$

$$HO(CH_2)_4NH_2,\ CH_3CHOHCH_2CH_2NH_2$$

$$CH_3CHOHCHNH_2CH_3$$

and other alkanolmonoamines of up to 20 atoms which can have more than one OH group, and can have either straight or branched chain alkylene or oxaalkylene groups or hydroxycycloaliphatic amines such as

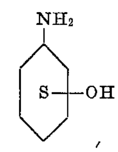

in which the ring is a cyclohexyl ring or

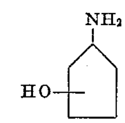

in which the ring is cyclopentyl and the OH can be attached to any C atom in the ring other than that containing the $NH_2$ group. Derivatives of the alkanolamines containing chlorine, cyano or alkoxy substituents can also be employed as reactants.

With primary amino alkanols the two types of compounds are formed one of which has the common formula HO-alkylene or

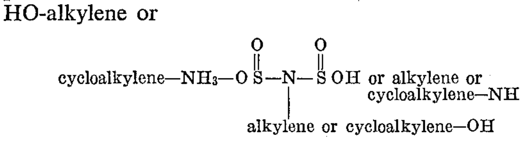

and which are formed by reacting a large excess of $SO_2$ with an alkanol amine of the formula $H_2N$-alkylene-OH and the second type has the common formula

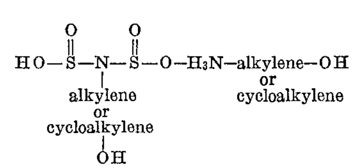

which are formed by reacting an excess of primary aminoalkanol with $SO_2$.

The products formed with primary monoamines have the common formula

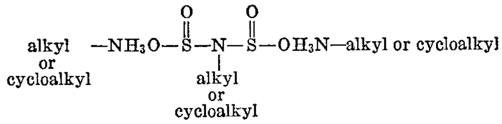

These compounds are formed by using an excess of $SO_2$ in the reaction mixture.

The reaction can be effected with or without an inert diluent, but a diluent which is a solvent for $SO_2$ and the amine is preferred. If no diluent is employed it is difficult to control the concentrations of the reactants unless the $SO_2$ is liquefied, and in such event the heat generated by the reaction is removed only with some difficulty. Representative inert diluents include the liquid hydrocarbons such as petroleum fractions, or pure aliphatic hydrocarbons of 5–10 carbon atoms, benzenoid hydrocarbons such as benzene, toluene, xylene or durene, the liquid aliphatic ethers, or alcohols or halogenated hydrocarbons. The latter are preferred because they can be readily obtained in substantially anhydrous conditions and are easily dried, if contaminated with small amounts of water. Another advantage of using certain liquid halogenated hydrocarbons as diluents is that the new compounds are practically insoluble in them, so that they can be readily separated therefrom by filtration. Representative halogenated diluents are $CH_2Cl_2$, $CH_2Br_2$, $CH_2ClBr$, $CCl_4$, $CH_3CH_2Cl$, $CH_2ClCH_2Cl$, $CH_3CHCl_2$, or chlorobenzene. Particularly preferred is $CH_2Cl_2$.

For the preparation of the compounds of this invention in which a non-hydroxylated primary amine is a reactant it is essential only to commingle a stoichiometric excess of $SO_2$ with the primary monoamine under substantially anhydrous and oxygen-free conditions. The reaction takes place very rapidly with heat generation. The molar ratio of reactants should be in excess of two mols of $SO_2$ for every three mols of amine, and preferably about 1.2–2.5 mols of $SO_2$ are employed per mol of amine. Molar amounts of $SO_2$ greater than 2.5 per mol of amine are operative, but there is no advantage in using such large excesses of the reactant. With hydroxylated amines the molar ratio of $SO_2$ to amine can range from 3 to 1 to about 1 to 3, respectively. If the hydroxylated amine is present in molar excess the predominant compound is an imidodisulfinic acid bis(hydroxylamine) salt and if the $SO_2$ is in excess the predominant compound is an imidodisulfinic acid mono(hydroxylamine) salt.

The reaction will proceed at any temperature from that at which $SO_2$ is liquid at atmospheric pressure up to the decomposition point of the salts. Temperatures ranging from −25 to about 100° C. are operable. However, for practical reasons and economy, it is prefered to operate at temperatures of 10–50° C. In this range the reaction proceeds rapidly, $SO_2$ is sufficiently soluble in the diluent to assure proper concentration for the reaction desired and the heat of reaction can be removed with readily available cooling water. If the solid mono- or bis(aliphatic amine) aliphatic imidodisulfinate is insoluble in the diluent, the slurry which forms should be filtered in the absence of oxygen. If the imidodisulfinate is soluble in the diluent to an appreciable degree, the reaction product can be first concentrated preferably by vacuum distillation, and thereafter filtered, or if some precipitate forms in the reaction the solids can be separated first and the filtrate concentrated and refiltered.

The examples which follow are intended to illustrate the invention, not to limit it. All parts are by weight unless otherwise specifically indicated.

EXAMPLE 1

A one-liter three-necked flask equipped with a stirrer, a condenser and inlets for amine and $SO_2$ and an outlet for excess $SO_2$, which passed into a cold trap that was cooled with solid $CO_2$, was charged with 500 ml. of methylene chloride. The temperature of the solvent was 23° C. About 26.5 parts of $SO_2$ were fed into the reactor over a period of 15 minutes to saturate the methylene chloride and flush out air. Methyl amine was then added slowly without shutting off the $SO_2$ supply. Over a period of three hours 34.5 parts of the amine and an additional 122 parts of $SO_2$ were fed to the reactor at a rate such that the $SO_2$ was in stoichiometric excess. The mixture was stirred continuously during this period. The reaction flask was kept cool by immersing it in a water bath to which ice was added as needed. The

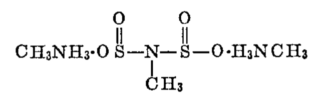

was almost completely insoluble in the methylene chloride. The slurry was placed in a closed filter and filtration was effected under dry nitrogen pressure. The filter cake was flushed with dry nitrogen for about 16 hours and then subjected to a vacuum for about 8 hours.

Eighty parts of the dried white crystalline bis(methylammonium) methylimidodisulfinate were recovered. This represents a yield of 94.2% based on the methylamine added to the reactor. On analysis the compound was found to contain 27.7% S and about 0.9% Cl, which indicates that traces of solvent were still present. The melting point was 110–115° C. Infrared analysis confirmed that the compound had the above structure.

EXAMPLE 2

The equipment and process steps were the same as those described in Example 1. In this run a total of 108 parts of ethylamine and 187 parts of $SO_2$ were fed to the reactor which contained 686 parts of $CH_2Cl_2$. The actual reaction period was about 2½ hours. The dried white crystals of

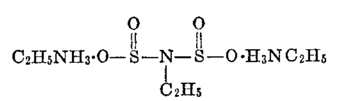

melted at 81–84° C. One hundred eighty-two parts of the compound were recovered. This represents a yield of 86.6% based on the amine reactant. On analysis it was found to contain 25.7%±0.9% S, and 0.6% Cl.

Infrared analysis confirmed the above structure for this compound.

EXAMPLE 3

The reactor described above was charged with 685 parts $CH_2Cl_2$ and then flushed and saturated with 30 parts $SO_2$. Cyclohexylamine was added slowly, together with $SO_2$, until an additional 150 parts $SO_2$ and 107 parts $C_6H_{11}NH_2$ were fed into the reactor. The solids of the slurry were separated as described in the previous examples. On drying and evacuating the solid, it was found to weigh 132 g. This white crystalline material sublimes at 172° C. The yield on the cyclohexylamine fed was 86.6% of theory.

Infrared analysis confirmed the structure

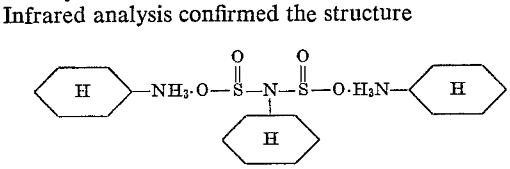

for the compound.

EXAMPLE 4

The reactor was charged with 680 parts $CH_2Cl_2$ and flushed with $SO_2$. Thereafter 87 parts of n-butyl amine and 168 parts of $SO_2$ were fed to the reactor over a period of about 3½ hours. The temperature was maintained at about 20–25° C. A total of 120 parts of a dry compound having the structure

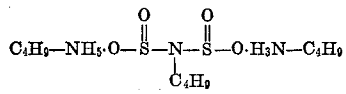

were recovered. The product was slightly yellow in color. The yield based on the n-butyl amine fed was 87.2%.

EXAMPLE 5

The apparatus of Example 1 was employed. The reactor was charged with 500 ml. $CH_2Cl_2$ and 29 grams of $SO_2$ were fed into the reactor over a period of 22 minutes. Monoethanolamine was then charged to the reactor along with $SO_2$. Over a period of 80 minutes 128 grams of the alkanolamine and an additional 129 grams of $SO_2$ were charged. Toward the end of the reaction the slurry became too thick to stir. The mixture was filtered in the absence of air, washed with 73 g. $CH_2Cl_2$ and the solids were swept with $N_2$ overnight. The recovered white solid weighed 258 g. Analysis showed the product to contain by weight 24.3% sulfur. This corresponds to a mixture of 74 mole percent of the 2:2 adduct

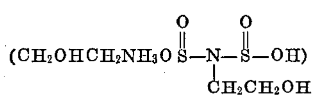

and 26 mole percent of the 3:2 adduct

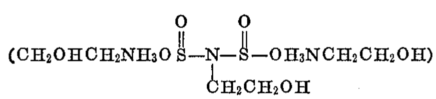

EXAMPLE 6

The reactor and general procedure was similar to that described above. Over a period of 20 minutes, 30 grams of $SO_2$ were fed into 671 g. of $CH_2Cl_2$. Without shutting off the $SO_2$ supply 106 g. of isopropanolamine were added in 100 minutes. During this time an additional 151 g. of $SO_2$ were fed to the reactor. The material in the reactor was a semi-solid, even after the addition of 175 g. $CH_2Cl_2$. Only a small amount of $CH_2Cl_2$ could be removed by filtration. The mixture of solvent and solids was swept with nitrogen for 24 hours, to remove $CH_2Cl_2$ as a vapor. The white solids remaining weighed 190 g. and contained 22.0% S by analysis. This sulfur content corresponds to 79% of the 2:2 adduct and 21% of the amine 3:2 $SO_2$ adduct.

Substitution of other primary amines as defined above, for those of the specific examples results in the formation of the corresponding bis(aliphaticammonium) aliphatic imidosulfinic acids.

We claim:

1. A solid composition of the formula

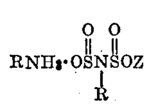

wherein R is a monohydroxylated open chain saturated hydrocarbon groups of 2 to 20 atoms and Z is selected from the group consisting of H and $H_3NR$.

2. A compound of claim 1 in which $R_1$ and $R_2$ is each a mono hydroxyalkyl group of 2 to 20 C. atoms and Z is H.

3. A compound of claim 1 in which $R_1$ and $R_2$ each is a mono hydroxyalkyl group of 2 to 20 C. atoms and Z is $\cdot H_3N$-hydroxyalkyl of 2 to 20 C. atoms.

4. A compound of claim 2 of the structure

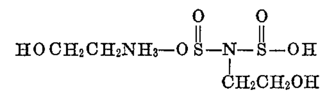

5. A compound of claim 3 of the structure

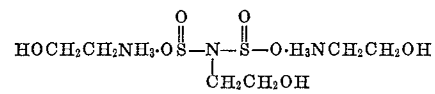

6. A compound of claim 2 of the structure

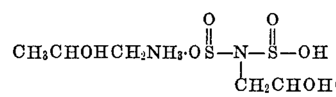

7. A compound of claim 3 of the structure

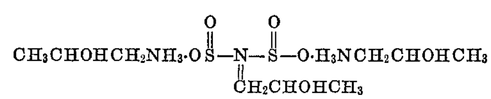

8. A method of preparing a solid composition of the formula

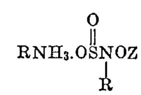

wherein R is a monohydroxylated open chain saturated hydrocarbon group of 2 to 20 C. atoms and Z is selected from the group consisting of H and $H_3NR$ comprising simultaneously commingling an amine of the formula $RNH_2$ with $SO_2$ an inert diluent saturated with $SO_2$, under substantially anhydrous and oxygen free conditions at a temperature below the decomposition temperature of the compound of said formula, the mole ratio of $SO_2$ to said amine being greater than 1, and recovering said solid composition from the reaction product.

9. The method of claim 8 in which the reaction temperature is between −25 and 100° C.

10. The method of claim 8 in which the amine and $SO_2$ are fed into a reactor simultaneously.

References Cited

UNITED STATES PATENTS 3,169,992 2/1965 Henn ---------------- 260—584

FOREIGN PATENTS 958,678 5/1964 Great Britain.

LEON ZITVER, Primary Examiner

M. W. GLYNN, Assistant Examiner

U.S. Cl. X.R.

260—465.5, 464; 252—408